United States Patent [19]

Bohannon, Jr. et al.

[11] E Patent Number: Re. 33,459

[45] Reissued Date of Patent: Nov. 27, 1990

[54] OPTICAL FIBER CABLE

[75] Inventors: William D. Bohannon, Jr.; Michael D. Kinard; Mickey R. Reynolds, all of Lawrenceville, Ga.

[73] Assignee: AT&T Bell Laboratories, Murray Hill, N.J.

[21] Appl. No.: 347,113

[22] Filed: May 2, 1989

Related U.S. Patent Documents

Reissue of:

[64] Patent No.: 4,765,712
Issued: Aug. 23, 1988
Appl. No.: 825,291
Filed: Jan. 31, 1986

[51] Int. Cl.[5] ..... G02B 6/44

[52] U.S. Cl. ..... 350/96.23

[58] Field of Search ..... 350/96.23; 174/68 R, 174/102 R, 102 C, 102 D, 107, 110 R, 113 R, 120 R, 120 SR

[56] References Cited

U.S. PATENT DOCUMENTS

| | | | |
|---|---|---|---|
| 3,360,409 | 12/1967 | Jachimowicz et al. | 228/130 |
| 4,078,853 | 3/1978 | Kempf et al. | 350/96.23 |
| 4,241,979 | 12/1980 | Gagen et al. | 350/96.23 |
| 4,518,034 | 5/1985 | Vokey | 156/54 |
| 4,552,432 | 11/1985 | Anderson et al. | 350/96.23 |
| 4,557,560 | 12/1985 | Bohannon et al. | 350/96.23 |
| 4,723,831 | 2/1988 | Johnson et al. | 350/96.23 |

FOREIGN PATENT DOCUMENTS

| | | | |
|---|---|---|---|
| 0133873 | 3/1985 | European Pat. Off. | 350/96.23 |
| 3222541 | 12/1983 | Fed. Rep. of Germany | 350/96.23 |
| 61-86448 | 5/1986 | Japan | 350/96.23 |
| 2052092 | 1/1981 | United Kingdom | 350/96.23 |
| 2063502 | 6/1981 | United Kingdom | 350/96.23 |
| 2099173 | 12/1982 | United Kingdom | 350/96.23 |
| 2128358 | 4/1984 | United Kingdom | 350/96.23 |
| 2159977 | 12/1985 | United Kingdom | 350/96.23 |
| 2165961 | 4/1986 | United Kingdom | 350/96.23 |

OTHER PUBLICATIONS

Publication, *News for Design Engineers,* Jul. 2, 1984, Advertisement by Texas Instruments, Inc.

*Primary Examiner*—Frank Gonzalez
*Attorney, Agent, or Firm*—Edward W. Somers

[57] ABSTRACT

An optical fiber cable includes a core (22) comprising optical fibers (24–24) in ribbon or single fiber form and a sheath system (50) which provides flexibility for ease of handling and installation, strength to resist tensile and torsional stresses and rodent and/or lightning protection. The core is enclosed by a tube (28) which is made of a plastic material, a shield system (52) and outer plastic jacket (54). The shield system provides rodent and/or lightning protection. Strength is provided by a plurality of longitudinally extending strength members (58–58) which are disposed in a single layer concentric with the core and which in a preferred embodiment are disposed adjacent to an outer surface of the shield and with substantial portions of their perpheries embedded in the plastic of the outer jacket.

33 Claims, 4 Drawing Sheets

OPTICAL FIBER CABLE

Matter enclosed in heavy brackets [ ] appears in the original patent but forms no part of this reissue specification; matter printed in italics indicates the additions made by reissue.

TECHNICAL FIELD

This invention relates to an optical fiber cable. More particularly, it relates to an optical fiber cable having a peripheral strength member system and shield which result in an outer diameter that is significantly less than that of prior art optical fiber cables and which provides for improved performance.

BACKGROUND OF THE INVENTION

Optical fibers are in widespread use today as transmission media because of their large bandwidth capabilities and small size. However, they are mechanically fragile, exhibiting low strain fracture under tensile loading and degraded light transmission when bent. Accordingly, cable structures have been developed to protect mechanically the optical fibers thereby rendering them a realizable transmission medium.

A potential application for an optical fiber cable is in ducts. In such a use, the cable must be capable of withstanding tensile loads applied when the cable is pulled into the ducts and bending stresses caused when the cable is pulled through turns in the ducts and bent when being introduced through manholes.

An optical fiber cable suitable for such use is disclosed in Kempf et al U.S. Pat. No.4,078,853 which issued on Mar. 14, 1978. In one embodiment, a core of optical fiber ribbons is surrounded by a plastic, loosefitting inner jacket, a compliant layer of plastic twine and a plastic outer jacket which is reinforced with primary strength members. The strength members are embedded in the outer jacket to achieve substantial coupling therewith.

In other situations, greater tensile loads may be encountered, especially where ducts are extremely conjested or where the ducts have more bends than usual. If more strength members are added to the above-described cable to meet these increased requirements, bending flexibility which is so necessary to ease cable handling and installation decreases. A cable which is capable of resisting relatively high tensile loads while exhibiting bending flexibility is disclosed in U.S. Pat. No. 4,241,979 which issued on Dec. 30, 1980 in the names of P. F. Gagen and M. R. Santana. In it, the coupling between the strength members and an outer plastic jacket is precisely controlled. A bedding layer of material, about which the strength members are wrapped helically, is added between a plastic inner jacket and the outer jacket to control the extent to which the strength members are encapsulated by the outer jacket. By preventing encapsulation of portions of the strength members, the strength members are still tightly coupled to the outer jacket under a tensile load, but are capable of sliding with respect to the outer jacket under local bending where no encapsulation occurs. Under tensile loading, sliding is eliminated substantially because sufficient shear and frictional coupling exists between the outer jacket and the strength members.

In one embodiment, the cable shown in U.S. Pat. No. 4,241,979 includes two reinforcement strength members layers which are wrapped helically in opposite directions which are wrapped helically in opposite directions. Under a tensile load, these two layers of strength members produce equal but oppositely directed torques about the longitudinal axis of the cable to ensure the absence of torsional creep under sustained tensile loads.

Optical fiber cables also may be strung between poles or buried in the ground thus exposing them to abuse such as, for example, attack by rodents, mechanical abrasion and crushing. It has been found that cables having an outer diameter below a critical size of about 0.75 inch diameter, which is typically an upper limit for optical fiber cables, are more apt to be damaged by rodents than are larger cables because the animals can bite directly down on them. For cables above the critical size, the use of a corrugated common grade steel shield having a longitudinally overlapped seam has provided sufficient protection. A longitudinally applied shield, if otherwise suitable, is economically preferable from a manufacturing standpoint. However, in the smaller sizes, such a steel shield arrangement has led to failures. Rodents have been able to encompass the cable with their teeth and pull open the seam. Moisture which enters the cable through rodent-caused openings in the jacket causes the common grade steel shield to corrode.

Both buried and aerial cables also are damaged by lightning strikes. Thermal damage, that is burning, charring and melting of the sheath components, is caused by the heating effects of the lightning arc and a current being carried to ground by the metallic members of the core or sheath. In buried cables, a second mode of damage is mechanical, causing crushing and distortion of the sheath. This results from an explosive impact, sometimes called a steamhammer effect, which is caused by the instantaneous vaporization of water in the earth in a lightning channel to the cable.

A cable which provides suitable protection against rodents and lightning is disclosed in U.S. Pat. No. 4,557,560 which issued on Dec. 10, 1985 in the names of W. D. Bohannon Jr. et al. In it, a core is enclosed in a shield made of a highly conductive material such as copper, for example, and in a corrugated outer shield comprising a corrosion-resistant metallic material such as stainless steel to which is bonded an adhesive system. The adhesive system comprises a first adhesive material which is bonded to an outer surface of the corrosion-resistant metallic material and a second adhesive material or carrier which becomes bonded to an outer jacket as plastic material is extruded about the outer shield to form the jacket. Even if the outer jacket is violated by rodents and the outer shield is exposed, the stainless steel does not corrode and the integrity of the inner portions of the cable is preserved. The resistance to rodents is a function of the thickness and hardness of the outer shield. Also, the bonding of the jacket to the outer shield helps to prevent lifting of the seam by rodents. Such a design cable also provides lightning protection which is needed in optical fiber cables which employ metallic strength members and/or metallic shields for mechanical protection.

As should be apparent, this last design cable and others which are commercially available have added lightning and rodent sheath protection to an existing cable design. This has resulted in a cable which may be unnecessarily large in outer diameter and one which may require excessive manufacturing floor space, material and labor.

What is needed and what seemingly is not provided by the prior art is a cable system which provides lightning or rodent protection or both and which may be manufactured simply and inexpensively with existing equipment. Further, a shield design to provide this kind of protection should be one which is integrated with the other elements of the cable design.

SUMMARY OF THE INVENTION

The foregoing problems have been overcome to the cable of this invention which includes an optical fiber core that is enclosed by a sheath system that provides rodent and/or lightning protection. The sheath system includes a tube which is made of a plastic material and which encloses the core. A plurality of longitudinally extending strength members are disposed in a single layer. The rodent and/or lightning protection is provided by a single metallic shield which encloses the plastic tube. An outer jacket which is made of a plastic material is bonded to an outer surface of the metallic shield. The shield and the jacket are coupled together sufficiently to enhance substantially the torsional stability of the cable and to inhibit relative movement between portions of the sheath system when the cable is being handled and/or installed. In a longitudinal direction along the cable, the strength members are decoupled sufficiently from the other portions of the sheath system to cause said cable to be relatively flexible during bending of the cable.

In a preferred embodiment, the longitudinally extending strength members are disposed between the metallic shield and the outer jacket and are generally in intimate contact with an outer surface of the metallic shield and the outer jacket. The shield is bimetallic and is a laminate comprising an inner layer of corrugated copper, which provides lightning protection, and an outer layer of corrugated stainless steel, which provides protection against rodents. The term laminate is intended to cover a plurality of metallic layers which are adhesively or metallurgically bonded together.

An outer surface of the shield system is bonded to the outer plastic jacket. The bonding is effected through an adhesive system which includes an outer layer of polyethylene which contacts the jackets. Also, the copper and the stainless steel layers are bonded together through an adhesive system comprising three layers of materials. However, the functionality of the bimetallic shield is not dependent on whether one or three layers of adhesive are used to bond together the metallic layers nor on whether or not the metallic layers are bonded together adhesively or metallurgically.

The strength of the cable is not diminished by the use of only a single layer of larger strength members instead of the dual layer of smaller members of prior art designs. The bonding between the shield and the outer jacket resists torsional loading of the cable. Advantageously, the use of only a single layer of strength members results in an outer diameter which is reduced over that of prior art cables.

The cable of this invention includes different embodiments which depend on the end use of the cable. In one which requires only lightning protection, a shield having only a relatively high conductivity need be used whereas for a cable requiring only rodent protection, only the steel outer shield is used. The copper-stainless steel shield laminate of the preferred embodiment is used to protect the cable against lightning and against rodents.

BRIEF DESCRIPTION OF THE DRAWINGS

Other features of the present invention will be more readily understood from the following detailed description of specific embodiments thereof when read in conjunction with the accompanying drawings in which.

DETAILED DESCRIPTION

Figure 1:
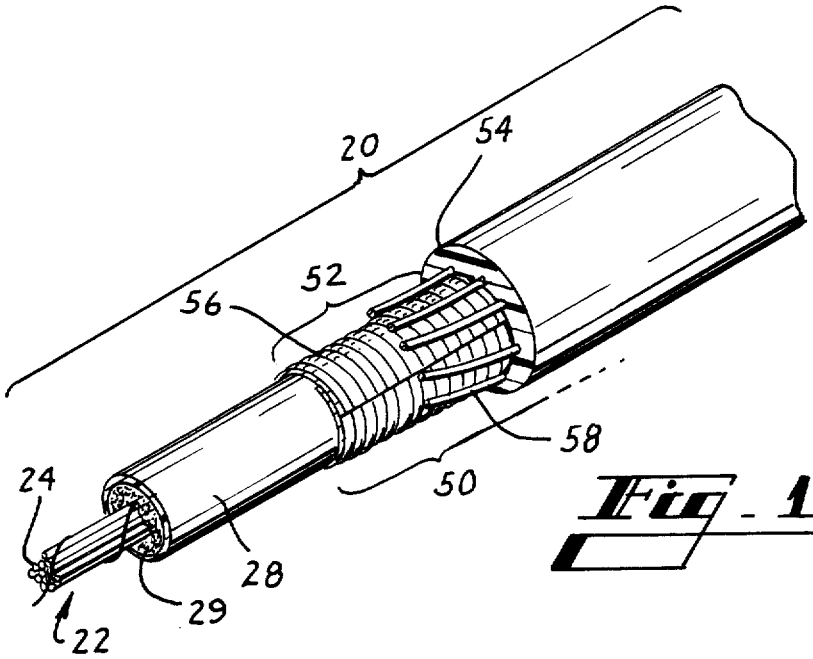
FIG. 1 is a perspective view of a cable of this invention.
Figure 2:
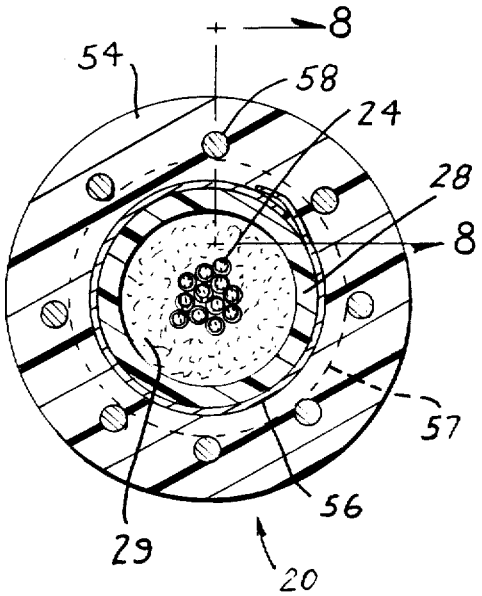
FIG. 2 is an end sectional view of the cable of FIG. 1.

Referring more to FIGS. 1 and 2, there is shown a lightguide cable, which is designated generally by the numeral 20. The cable 20 includes a core 22 which includes a plurality of coated optical fibers 24-24. In one embodiment, the optical fibers 24-24 are assembled into ribbons 26-26 (see FIG. 3) with a plurality of ribbons being stacked together. In a preferred embodiment, the optical fibers 24-24 are arranged in units with the optical fibers in each unit not being stranded. Surrounding the core 22 is a tube 28 that is made of an insulation material such as high density polyethylene. An arrangement of units of non-stranded optical fibers 24-24 enclosed in a loose fitting tube 28 is disclosed and claimed in Application Ser. No. 721,533 which was filled on Apr. 7, 1985 in the names of Charles Gartside, Andrew Panuska and P. D. Patel. Typically, the tube 28 has a wall thickness of about 0.030 inch. Also, as can be seen in FIGS. 1 and 2, the tube 28 may be filled with a suitable waterblocking material 29.

In the prior art, the above-identified enclosed core 22 and tube 28 is surrounded by an inner jacket 31 (see FIGS. 4 and 5), and an intermediate jacket 33 each of which jackets is made of a plastic material. Further, partially embedded in each jacket 31 and 33 are a plurality of longitudinally extending strength members 34-34 which are made of steel, for example. Of course, the strength members may be non-metallic and made of a glass fiber reinforced material, for example. Portions of the strength members are in intimate contact with bedding layers 35-35 to render predetermined surfaces of the strength members sufficiently inaccessible for coupling with the plastic extrudate which is used to provide the overlying jacket. This reduces jacket-wire coupling so that the strength members 34-34 can more readily slide with respect to the jacket plastic during local cable bending. The bedding layers are more fully described in priorly identified U.S. Pat. No. 4,241,979 which is incorporated by reference hereinto. This sheath system and core may function alone as a complete cable.

Figure 4:
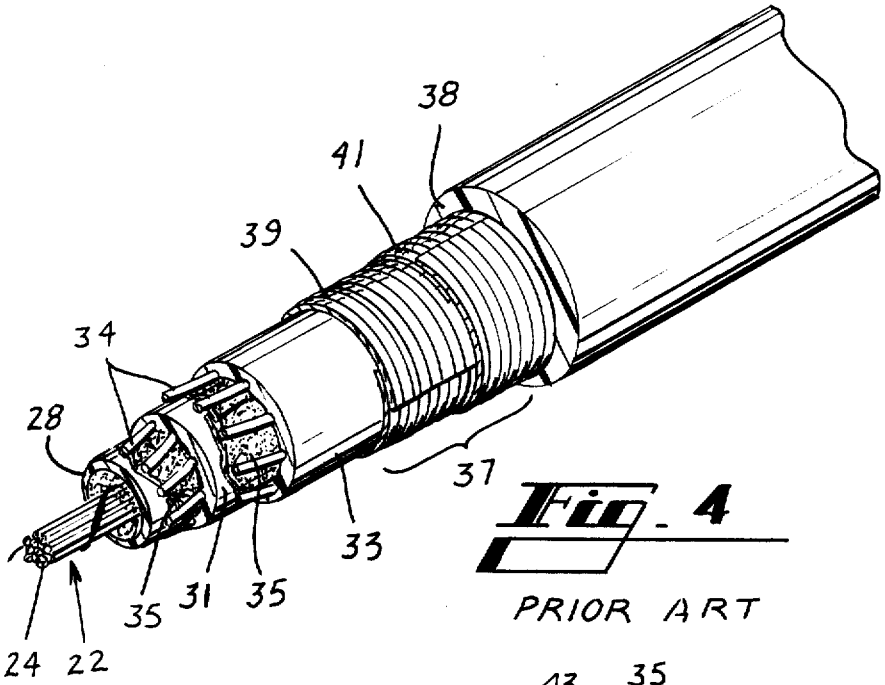
Fig. 4 PRIOR ART
FIG. 4 is a perspective view of a prior art cable.

The prior art cable of FIG. 4 may also be provided with an oversheath shield system 37 which underlies an outer jacket 38. The shield system 37 may include an inner shield 39 which is made of a metallic material having a relatively high electrical conductivity. Copper is an example of a material which may be used for the inner shield. It is corrugated and provides the cable with lightning protection.

Figure 5:
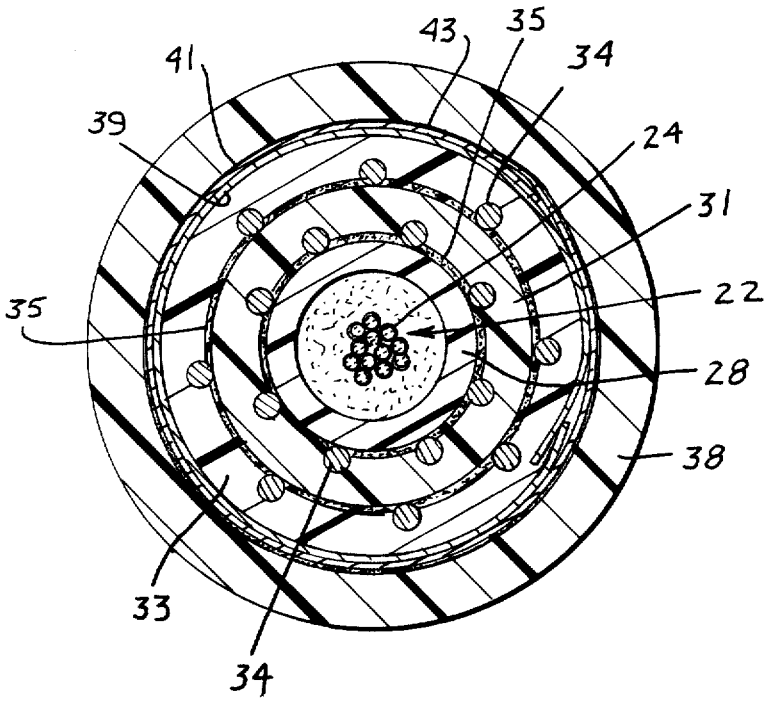
Fig. 5 PRIOR ART
FIG. 5 is an end sectional view of the prior art cable of FIG. 4.

Surrounding the inner shield 39 in the cable of FIGS. 4 and 5 is an outer shield 41 which is bonded to the jacket 38 to enhance moisture protection and to enhance the mechanical performance of the cable. Typically, it is made of a corrosion-resistant material such as stainless steel, for example, and as such it provides enhanced protection against damage from rodent attack. The outer shield 41 is bonded to the outer jacket 38 through an adhesive system 43, which includes first and second adhesive materials. The first adhesive material provides an excellent bond to the stainless steel metallic material of the outer shield whereas the second adhesive material provides an excellent bond to the outer jacket 38. This cable is disclosed and claimed in priorly mentioned U.S. Pat. No. 4,557,560 which is incorporated by reference hereinto.

In the cable 20 of this invention, the strength, lightning and rodent protection requirements are integrated into a sheath system 50 (see FIGS. 1 and 2) at the outset instead of being provided for an already designed cable. As can be seen in FIGS. 1 and 2, the loose tube 28 is enclosed by the sheath system 50 which includes a corrugated shield system 52 and an outer jacket 54 having a wall thickness of about 0.050 inch.

For the outer jacket 54, a plastic material such as a black high density polyethylene material, having a density in the range of 0.950–0.973 gm/cm$^3$, may be used. This is advantageous inasmuch as these polyethylene materials exhibit excellent properties at low temperatures in the field and are tougher than other polyethylene materials.

Figure 3:
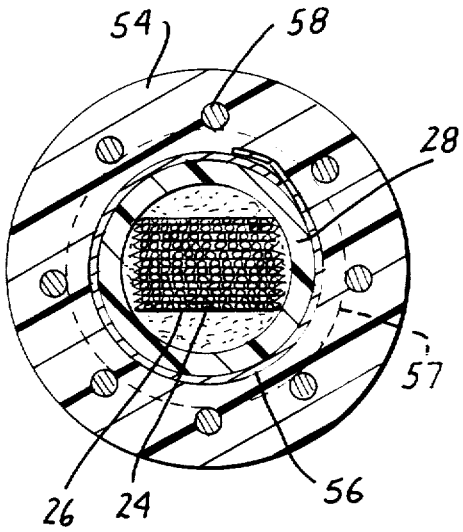
FIG. 3 is an end sectional view of a ribbon cable which includes the sheath system of this invention.

Adjacent to an outer surface 56 of the shield system 52 are a plurality of longitudinally extending strength members 58-58 (see FIGS. 1–3). In FIGS. 1–3 of the drawings, it should be appreciated that a broken line circle which is designated 57 represents the outer surface of the crests of the corrugations of the outer shield. It is these crests with which the strength members 58-58 are in engagement. The strength members may be made of high tensile strength carbon steel, for example, in which event each member has an outer diameter in the range of about 0.014 to 0.025 inch and 0.023 inch in the preferred embodiment. Of course, the strength members may be made of other materials such as glass fiber reinforced plastic, for example. For particular applications, only two strength members 58-58 may be used. In such a cable, the diameter of each of the strength members may be 0.060 inch.

As can be seen in FIGS. 1 and 2, the strength members 58-58 are disposed in only a single layer which is concentric with the core 22. This compares with the dual layer used in the prior art cables of FIGS. 4 and 5. In other prior art cables, strength for tensile loading of the cable is provided by a centrally disposed strength member.

In the preferred embodiment, the strength members 58-58 are wrapped helically about the shielding system 52. However, it is within the scope of this invention to assemble the strength members 58-58 to the cable 20 such that they do not have an intentional lay and are substantially parallel to a longitudinal axis of the cable.

Figure 6:
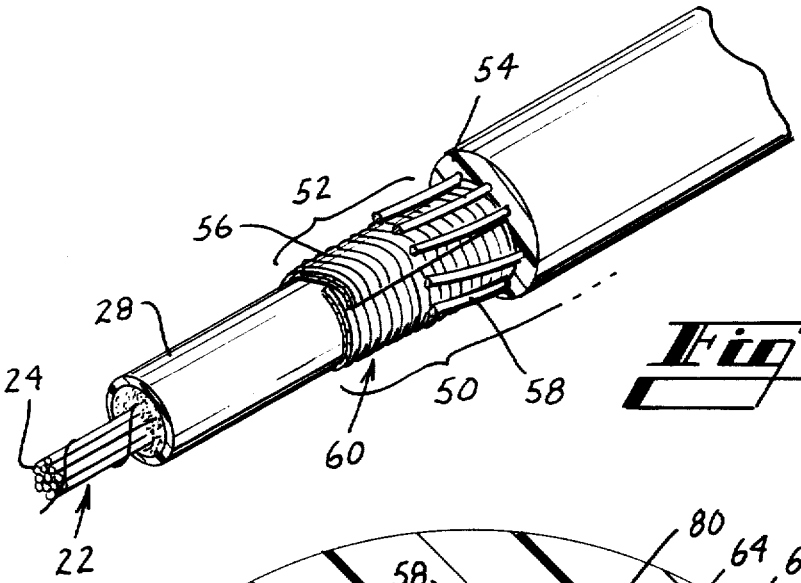
FIG. 6 is a perspective view of a preferred embodiment of this invention.
Figure 7:
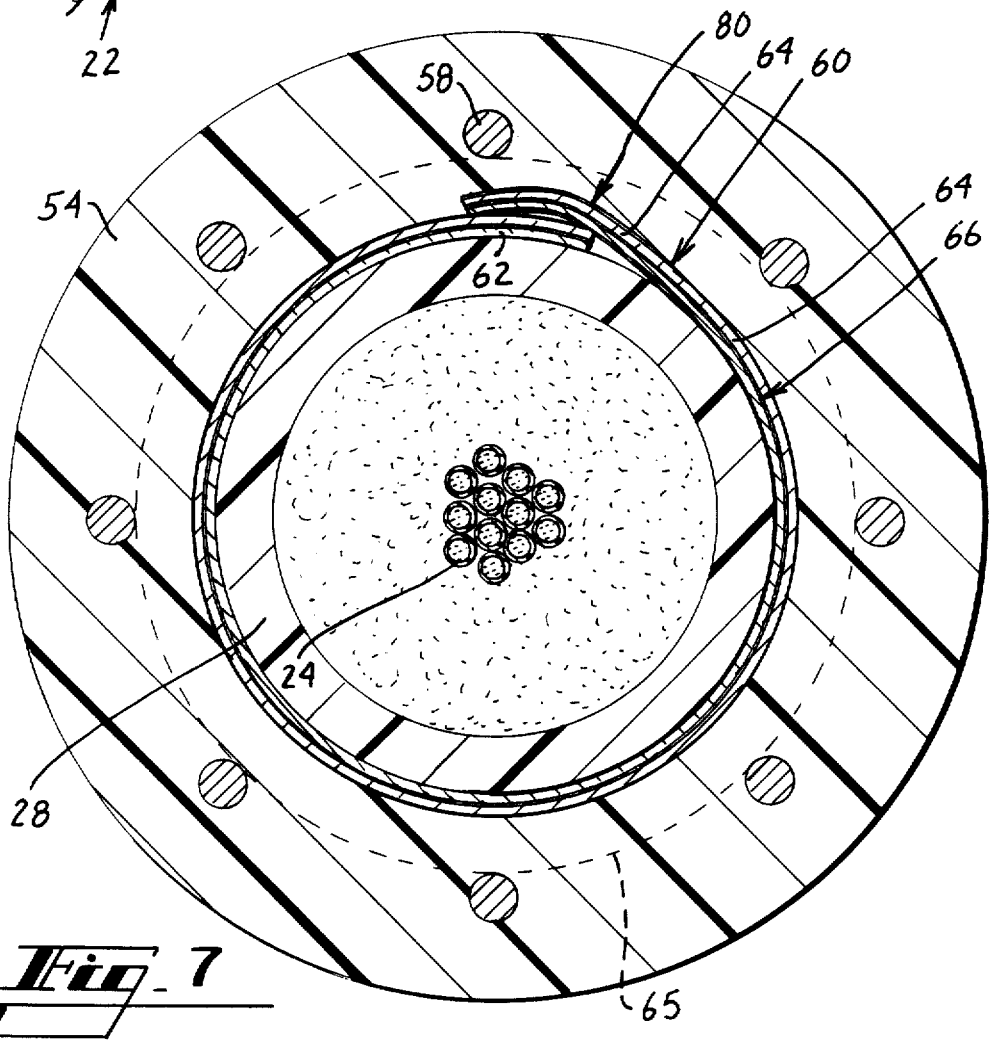
FIG. 7 is an end sectional view of the cable of FIG. 6.

The shield system 52 of the preferred embodiment is a corrugated laminate 60 (see FIGS. 6–8) comprising an inner shield 62 which is made of a metallic material such as copper which has a relatively high electrical conductivity to provide lightning protection and an outer shield 64 which is made of a corrosive resistant material such as stainless steel to provide mechanical protection. In FIG. 7, as in FIGS. 2 and 3, the crests of the corrugated laminated shield system 52, which are the crests of the outer surface of the outer shield 64, are shown by a broken line which in FIG. 7 is designated by the numeral 65. As seen in FIG. 7, the strength members 58-58 generally are in engagement with the outer crests of the corrugated laminate 60.

Figure 8:
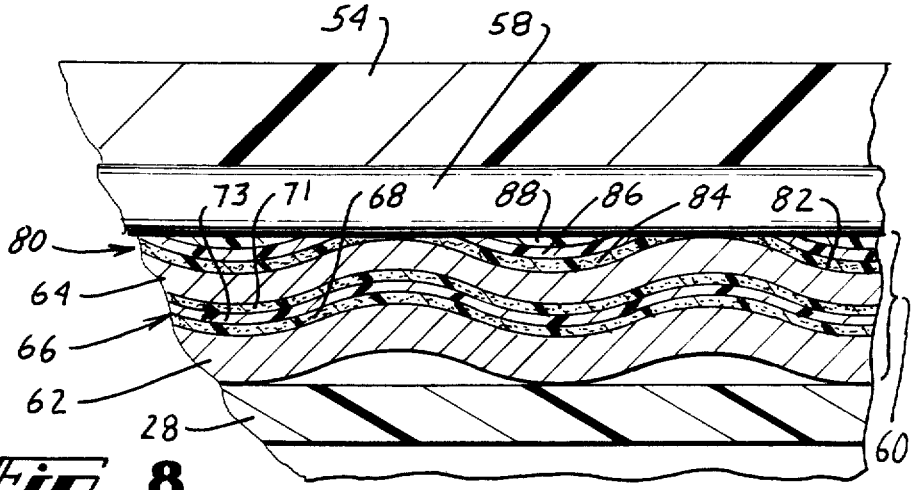
FIG. 8 is a detailed view of a portion of the sheath system of the cable in FIGS. 6 and 7.

Bonding between the two metallic layers of the preferred embodiment is accomplished through an adhesive system which is designated generally by the numeral 66 (see FIG. 8). The adhesive system 66 includes three layers of adhesive-like material. A layer 68 of an acrylic acid copolymer material, for example, engages the inner shield 62 and a layer 71 of the same material engages the outer shield 64. A layer 73 of polethylene plastic material is disposed between the two layers 68 and 71. The layer 73, which has a higher melting point than the materials of the layers 68 and 71, functions as a carrier for those materials to facilitate the laminating of the layers. Typically the inner and outer shields 62 and 64 have thicknesses of 0.005 inch and 0.003 inch, respectively, and the adhesive system has a thickness of 0.003 inch with each of the layers 68, 71 and 73 having a thickness of 0.001 inch.

In the preferred embodiment, the adhesive material of the layers 68 and 71 is a terpolymer which comprises an ethylenically unsaturated carboxylic acid, an ester of an ethylenically unsaturated carboxylic acid and ethylene and which has a thickness of about 0.001 inch. Specifically, the terpolymer comprises about 85–90% by weight of ethylene, about 3–5% by weight of an acrylic acid and an acrylic acid ester. Together, the acrylic acid and the acrylic acid ester comprises about 10–15% by weight of the terpolymer composition. See U.S. Pat. No. 4,122,248 which is incorporated by reference hereinto.

The adhesive system 66 is important to the successful corrugation of the laminate 60. Without it, excessive cold working may occur during corrugating. This could cause excessive corrugation pull-out when the corrugated laminate is advanced through a forming die and the shield to be incapable of resisting bending strains. The adhesive system 66 allows a sufficient degree of freedom between the metallic layers which comprise the shield system so that the metallic layers are capable of sliding with respect to each other as the laminate is advanced through corrugating rolls to avoid excessive cold working.

In order to provide suitable bonding of the shield system 60 to the outer plastic jacket 54, a bonding system 80 (see FIG. 8) is provided on an outer surface 82 of the outer metallic layer 64. The bonding system 80 includes a layer 84 of acrylic acid copolymer material which engages the outer surface of the outer metallic layer of the shield and which has a thickness of 0.001 inch. In the preferred embodiment, the layer 84 is made of the same material as the layers 68 and 71. Superimposed on the layer 84 are two 0.001 inch layers 86 and 88 of polyethylene plastic materials, an outer one of which bonds to the outer plastic jacket 54. The polyethylene or other carrier material, which is compatible with the plastic of the outer jacket 54, could just as well be provided in one layer instead of two. If the two outer layers are comprised of the same adhesive-like material, than only one layer having a thickness of 0.002 inch may be used.

Advantageously, the bonding system 80 inhibits the diffusion of moisture into the cable and is of help in causing the sheath system to exhibit unitary characteristics. The bonding causes the cable 20 to resist torsional stresses which is particularly important when the cable includes only a single layer of helically extending strength members. Also, the bonding of the outer jacket to the shield system 52 is of help in providing the cable with rodent protection. Rodents are hampered in lifting a portion of the overlapped seam.

Figure 9:
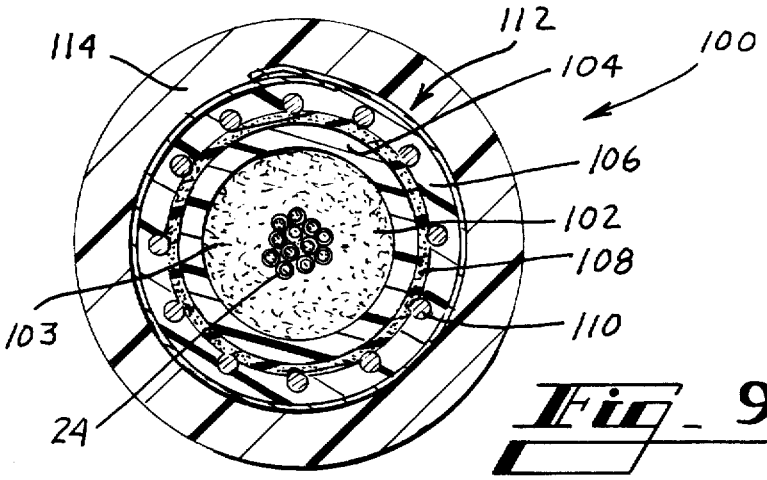
FIG. 9 is an end sectional view of another embodiment of the cable of this invention.

An alternate embodiment of a cable of this invention is shown in FIG. 9. A cable designated generally by the numeral 100 includes a core 102 which may comprise a plurality of optical fiber ribbons or a plurality of optical fiber units and which may be filled with a waterblocking material 103. The core 102 is enclosed in a tube 104 which preferably is made of a high density polyethylene plastic material. The tube 104 is enclosed by an extruded inner jacket 106 which is made of a plastic material such as polyethylene and which has a wall thickness of about 0.033 inch.

A bedding layer 108 is interposed between the inner jacket 106 and the tube 104 to provide a slippage plane for a plurality of longitudinally extending strength members 110-110 which are wrapped helically about the tube 104. As will be recalled in U.S. Pat. No. 4,241,979, the bedding layer shields portions of the strength members 110-110 from the extrudate of the enclosing inner jacket 106. Typically, the bedding layer 108 has a thickness of about 0.008 inch and is wrapped longitudinally about the tube 104 with a longitudinally extending seam.

The bedding layer 108 controls coupling between the strength members 110-110 and the jacket 106. The bedding layer 108 intimately interfaces with portions of the surfaces of the strength members 110-110 to render those surface portions of the strength members sufficiently inaccessible for coupling with the plastic jacket 106. This prevents complete encapsulation of the strength members 110-110.

During manufacture, the strength members 110-110 are helically wrapped onto the bedding layer 108 under tension so that portions of the surfaces of the strength members make intimate surface contact with the bedding layer. Then, the jacket 106 is pressure extruded onto the bedding layer and strength members. The bedding layer 108 is sufficiently stiff to in inhibit the flow of the jacket plastic extrudate to the portions of the surfaces so that encapsulation of those surfaces is prevented. This reduces jacket-wire coupling sufficiently so that the strength members can more readily slide with respect to the jacket during local cable bending.

Preventing encapsulation of these surfaces has little effect on the reinforcing tensile strength of the helically wrapped strength members 110-110. When the extruded plastic material of the jacket 106 cools during manufacture, it forms a tight fit about the strength members 110-110. During tensile loading of the cables, the helically wrapped strength members 110-110 attempt to move radially but are prevented from doing so by the underlying core tube 104. Any attempt to move circumferentially is prevented because of the surrounding inner jacket 106. Sufficient shear coupling exists between the strength members and the jacket 106 to ensure suitable coupling between the strength members and the jacket in a longitudinal direction over the complete length of the cable.

The bedding layer may be made of a thin layer, 0.008 inch, for example, of spunbonded polyester. A spunbonded polyester suitable for such use is a standard product of E. I. DuPont de Nemours and Company. Spunbonded polyester is sufficiently compliant to develop trough-like recesses which increase surface contact with the strength members having circular cross sections.

In the cable, the bedding layer 108 is disposed completely about the tube 104. This facilitates removal of the sheath system from the tube-enclosed core. Further, this permits the shield system to dominate the bending behavior of the cable.

Where the strength members 110-110 are encapsulated by the plastic extrudate of the jacket 106, the jacket forms a close fit, like a closed ring, which substantially mitigates against relative circumferential movement of the strength members with respect to the jacket. Where the strength members are seated onto the bedding layer the jacket forms a split-type ring, which more easily allows relative movement of the strength members in a longitudinal direction with respect to the jacket under local bending.

Over the inner jacket 106 is disposed a shielding system 112 which may comprise, as in the preferred embodiment, a corrugated copper-stainless steel laminate to provide lightning and rodent protection. The shielding system 112 typically has an apparent thickness of about 0.030 inch after being corrugated. The shielding system 112 is enclosed by an outer jacket 114 which is made of a plastic material and which typically has a thickness of about 0.050 inch. In this embodiment as in the preferred one, the longitudinally extending strength members may be in intimate contact with the metallic shield system.

Figure 10:
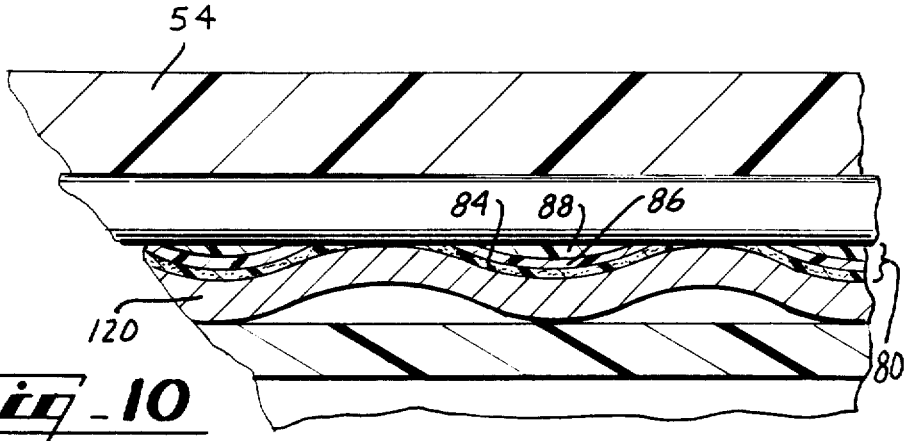
FIG. 10 is a detail view of a portion of the sheath system of the cable of FIG. 1.

In the cable of the preferred embodiment of this invention, the shielding system has been shown to be a laminate; however, it should be understood that it may take other forms such as a single shield 120, for example (see FIG. 10). For example, if only rodent resistance is required, it may be unnecessary to include a copper or other highly conductive metallic material in the shielding system. In that situation, for buried or overhead cables, a shielding system which comprises a 0.005 inch thick stainless steel metallic layer with an adhesive system for bonding to the plastic outer jacket is used. On the other hand, there may be times when a shield is required for lightning protection but when the cable will not be exposed to rodent attacks. In those instances, a copper shield alone will suffice and it is bonded directly to the outer jacket instead of through a stainless steel or other metallic rodent protective layer.

As a result of the structure of the cable of this invention, the outer diameter of the cable is reduced substantially from those of prior art cables. For example, a standard cross ply cable (see FIGS. 4 and 5) having an outer diameter of 0.41 inch has an outer diameter of 0.70 inch when provided with copper and stainless steel shields and an outer jacket. The outer diameter of the preferred embodiment of the cable of this invention is 0.42 inch. This is a substantial reduction in the size of the cable. Further, because of the arrangement and structure of the cable, the manufacturing process is simplified considerably.

In the cable of this invention as shown in FIG. 1, there is only one layer of helical strength members. Also, unlike the prior art cables, a single shield adjacent to the strength members is used. Of course, as described hereinbefore, the shield could be a laminated one comprising two metallic materials. It should be observed that the strength members in the embodiment of FIG. 9 are disposed as close to the neutral axis of the cable as possible. This renders the cable easier to bend and less likely to kink. This is accomplished by wrapping the strength members about the enclosing tubular member and extending the inner jacket thereover. In the embodiment shown in FIGS. 1–2 and 6–7, strength members are disposed adjacent to an outer surface of the shield but at a distance from the neutral axis of the cable cross sectional area which is not too much greater than in the embodiment of FIG. 9 because of the absence of the inner jacket.

The mechanical performance of the cable of this invention is improved because of the degree of circumferential and longitudinal coupling between portions of the sheath system. In the embodiments shown in FIGS. 1, 2, 6 and 7, the strength members 58-58 are embedded in the jacket 54 which is bonded to the shield system 52. As a result, the components of the sheath systems are coupled together sufficiently to enhance the torsional stability of the cable and to inhibit relative movement between portions of the sheath system.

Although only a single layer of strength members is used, there is sufficient resistance to torsional and pulling forces to avoid damage to the cable or any degradation of its performance characteristics. It will be recalled that in the Gagen U.S. Pat. No. 4,241,979, two layers of strength members are used and wrapped helically in opposite directions. This resulted in a torque-balanced cable. In the cables of this invention, because of the use of only one layer of strength members, the strength members tend to twist more tightly when subjected to tensile forces and are not balanced by another oppositely wrapped layer. However, in the cables of this invention, relative movement between portions of the cables is prevented in a manner which obviates the need for the the second layer of strength members. In the preferred embodiment, the shear coupling between the strength members and the jacket to which is bonded the shield system 52 is such that the shield cannot rotate through the jacket. In the embodiment of FIG. 9, there is sufficient coupling between the inner surface of the corrugated shield system and the inner jacket 112, in which are disposed the strength members, to prevent relative motion along that interface as the strength members impart torsional forces to the cable. Also, because the shield system and outer jacket of the cable of FIG. 9 during installation are clamped together with the inner jacket 106 and tube 104, the torsional resistance of the shield system and outer jacket counters the twist tendency of the single layer of strength members within the inner jacket. Of course, it is within the scope of this invention to bond adhesively the inner jacket to the inner surface of the shield system 112.

Further, the strength members are decoupled sufficiently in a longitudinal direction along the cable from other portions of the sheath system to cause the cable to be relatively flexible. When the cable is bent, the strength members must be capable of shifting longitudinally to distribute the strains associated with bending.

In the embodiments which are shown in FIGS. 1, 2, 6, and 7, the strength members 58-58 are in engagement with the crests of the corrugated shield system 52. As a result, the strength members 58-58 in those embodiments are capable of sliding relative to the shielding system 52 in a longitudinal direction when the cable undergoes bending during installation and handling. However, they are restricted substantially from any movement in the circumferential direction. In the embodiment shown in FIG. 9, longitudinal shifting of the strength members 110-110 is facilitated by causing the strength members to be disposed in engagement with the bedding layer 108. The bedding layer 108 is impervious to the plastic extrudate of the inner jacket 106 and renders portions of the peripheries of the strength members inaccessible to the plastic extrudate. This prevents complete encapsulation of those peripheries and although the encapsulation is sufficient to prevent circumferential shifting of the strength members, longitudinal shifting may occur to facilitate bending of the cable. If the strength members were not able to shift in a longitudinal direction during bending, the cable may kink causing damage to the optical fibers.

The use of the shield system 52 of the preferred embodiment is advantageous over the prior art in at least two respects. As a laminate of two metallic materials, the shield is stronger mechanically than a shield system which includes two separate unbonded metallic shields. This is true notwithstanding the use of corrugated shields because of imperfect nesting of the corrugations. Secondly, the use of two shields allows slippage therebetween, again notwithstanding the corrugations. This, of course, results in reduced coupling between the outer and inner portions of the sheath system.

Further, an optical fiber cable having a laminated shield which is bonded to an outer jacket is unlikely to twist and is stable during installation. A stainless steel shield having a 0.003 inch thickness may not be sufficient rodent protection, but backed by 0.005 inch copper, it is. Normally, rodent protection requires a thickness of 0.005 inch stainless steel even in the structure shown in U.S. Pat. No. 4,557,560. This is not true in a laminated shield which provides added strength and stiffness.

It is to be understood that the above described arrangements are simply illustrative of the invention. Other arrangements may be devised by those skilled in the art which will embody the principles of the invention and fall within the spirit and scope thereof.

What is claimed is:

1. An optical fiber cable, which comprises:

a core comprising at least one optical fiber;

a tube which is made of a plastic material and which encloses said core; and a sheath system which comprises:

a single metallic shield which encloses said tube;

a jacket which is made of a plastic material and which is bonded adhesively to an outer surface of said metallic shield to enhance substantially the torsional stability of the cable and to inhibit relative movement between portions of the sheath system; and a plurality of longitudinally extending strength members which are disposed in a single layer between said tube and said jacket which is bonded to an outer surface of said metallic shield and which are decoupled sufficiently from other portions of said sheath system in a longitudinal direction along the cable to cause said cable to be relatively flexible, *said strength members gener-*

*ally being spaced apart in a circumferential direction.*

2. The optical fiber cable of claim 1, wherein said single metallic shield is corrugated.

3. The optical fiber cable of claim 1, wherein each of said plurality of strength members is wrapped helically about a longitudinal axis of said cable.

4. The optical fiber cable of claim 1, wherein each of said plurality of strength members extends substantially parallel to a longitudinal axis of the cable.

5. The optical fiber cable of claim 1, wherein said strength members are capable of resisting tensile and compressive forces which are applied axially of said cable.

6. The optical fiber cable of claim 1, wherein said shield comprises a laminate which includes a layer of a first metallic material and a layer of a second metallic material which are bonded together.

7. The optical fiber cable of claim 6, wherein said first metallic material is copper and said second metallic material is stainless steel.

8. The optical fiber cable of claim 7, wherein said first metallic material is disposed adjacent to an outer surface of said tube.

9. The optical fiber cable of claim 8 wherein the first and second metallic materials are bonded together metallurgically.

10. The optical fiber cable of claim 8, wherein the first and second metallic materials are bonded together adhesively.

11. The optical fiber cable of claim 10, wherein said layers of metallic material are bonded together by a system which comprises a plurality of layers of adhesive materials.

12. The optical fiber cable of claim 11, wherein a layer of a first adhesive material is bonded to an outer surface of said first metallic material, a layer of a second adhesive material is bonded to an inner surface of said second metallic material and a layer of a third adhesive material is interposed between said first and second layers of adhesive materials.

13. The cable of claim 12, wherein said first adhesive material is a terpolymer comprising ethylene, an ethylenically unsaturated carboxylic acid and an ester of an ethylenically unsaturated carboxylic acid and said second adhesive material is the same as said first adhesive material.

14. The cable of claim 13, wherein said first adhesive material is a terpolymer comprising about 85–90% by weight of ethylene, about 3–5% by weight of any acrylic acid, and an acrylic acid ester, and wherein said acrylic acid and said acrylic acid ester together comprise about 10–15% by weight of said terpolymer.

15. The optical fiber cable of claim 1, wherein an outer surface of said shield includes an adhesive system which causes said jacket to become bonded to said shield.

16. The optical fiber cable of claim 15, wherein said adhesive system which causes said outer jacket to become bonded to said shield includes a terpolymer material which is bonded to said shield and a plastic material which is bonded to said terpolymer and to said jacket.

17. The optical fiber cable of claim 1, which also includes an inner jacket which is made of a plastic material and disposed concentrically about said tube and wherein said plurality of strength members are disposed adjacent to said tube and at least partially embedded in said inner jacket.

18. The optical fiber cable of claim 17, wherein an outer surface of said inner jacket is bonded adhesively to an inner surface of said shield.

19. An optical fiber cable, which comprises:

a core comprising at least one optical fiber; and a tube which is made of a plastic material and which encloses said core; and a sheath system which comprises:

a single metallic shield which encloses said tube;

a jacket which is made of a plastic material and which encloses and is bonded to an outer surface of said shield to enhance substantially the torsional stability of the cable and to inhibit relative movement between portions of the sheath system; and a plurality of longitudinally extending strength members being disposed in engagement with an outer surface of said shield and having substantial portions of the peripheries thereof embedded in said jacket, said strength members being decoupled sufficiently from other portions of said sheath system in a longitudinal direction along the cable to cause said cable to be relatively flexible *and generally being spaced apart in a circumferential direction.*

20. The optical fiber cable of claim 19, wherein said shield includes a strip of copper which has been wrapped about said tube.

21. The optical fiber cable of claim 19, wherein said shield includes a strip of stainless steel which has been wrapped about said tube.

22. The optical fiber cable of claim 19, wherein said shield comprises a laminate which includes a layer of a first metallic material and a layer of a second metallic material which are bonded together.

23. The optical fiber cable of claim 22, wherein said first metallic material is copper and said second metallic material is stainless steel and wherein said layer of first metallic material is disposed adjacent to an outer surface of said tube.

24. The optical fiber cable of claim 22, wherein said shield is corrugated and said layer of first metallic material is adjacent to said tube.

25. The optical fiber cable of claim 24, wherein said metallic materials are bonded together metallurgically.

26. The optical fiber cable of claim 24, wherein said metallic materials are bonded together adhesively.

27. The optical fiber cable of claim 26, wherein said layers of metallic material are bonded together by a system which comprises a plurality of layers of adhesive materials.

28. The optical fiber cable of claim 27, wherein a first layer of said adhesive system is bonded to an outer surface of said first metallic material, a second layer of said adhesive system is bonded to an inner surface of said second metallic material and a third layer of said adhesive system is interposed between said first and second layers of adhesive materials.

29. The cable of claim 28, wherein said first layer of adhesive material is a terpolymer comprising ethylene, and ethylenically unsaturated carboxylic acid and an ester of an ethylenically unsaturated carboxylic acid and said third layer of adhesive material is compatible with the plastic material of said jacket to said second layer of adhesive material is the same as said first layer of adhesive material.

30. The optical fiber cable of claim 19, wherein an outer surface of said shield includes an adhesive system which causes said jacket to become bonded to said shield.

31. The optical fiber cable of claim 19, wherein said single metallic shield is corrugated.

32. The optical fiber cable of claim 19, wherein each of said plurality of strength members is wrapped helically about a longitudinal axis of said cable.

33. The optical fiber cable of claim 19, wherein each of said plurality of strength members extends substantially parallel to a longitudinal axis of the cable.

* * * * *